United States Patent [19]

Simmons

[11] 4,379,571
[45] Apr. 12, 1983

[54] TRAILER WITH ADJUSTABLE WHEELS

[76] Inventor: Lovel R. Simmons, P.O. Box 1206, Jackson, Miss. 39205

[21] Appl. No.: 119,094

[22] Filed: Feb. 6, 1980

Related U.S. Application Data

[63] Continuation of Ser. No. 925,308, Jul. 17, 1978, abandoned.

[51] Int. Cl.³ .............................................. B62D 61/10
[52] U.S. Cl. ................................ 280/656; 180/24.02; 180/DIG. 2; 280/43.23; 280/677
[58] Field of Search ................ 180/24.01, 24.02, 209, 180/DIG. 2; 280/677, 678, 43.16, 43.17, 43.18, 43.19, 43.20, 43.21, 43.22, 43.23, 636, 638

[56] References Cited

U.S. PATENT DOCUMENTS

| | | |
|---|---|---|
| 2,519,002 | 8/1950 | Steven et al. ..................... 280/43.23 |
| 3,240,506 | 3/1966 | McMullen ........................ 280/43.23 |
| 3,305,876 | 2/1967 | Hutt ................................. 280/43.23 |
| 3,429,585 | 2/1969 | Ross ................................. 280/43.23 |
| 3,467,408 | 9/1969 | Regalia ............................... 280/656 |
| 3,533,641 | 10/1970 | Driskill ........................... 280/43.23 |
| 4,040,643 | 8/1977 | Applequist et al. ................ 280/656 |
| 4,049,143 | 9/1977 | Hatakka et al. ..................... 280/656 |

Primary Examiner—David M. Mitchell
Attorney, Agent, or Firm—Trexler, Bushnell & Wolters, Ltd.

[57] ABSTRACT

A trailer to be towed by a tractor is provided with structure for raising or lowering wheels relative to the trailer bed in accordance with the type of terrain to be traversed. Structure also is provided for shifting the wheels toward and away from one another transversely of the trailer bed and generally axially of the wheels to provide greater or lesser lateral stability in accordance with the roadway or terrain to be traversed.

2 Claims, 8 Drawing Figures

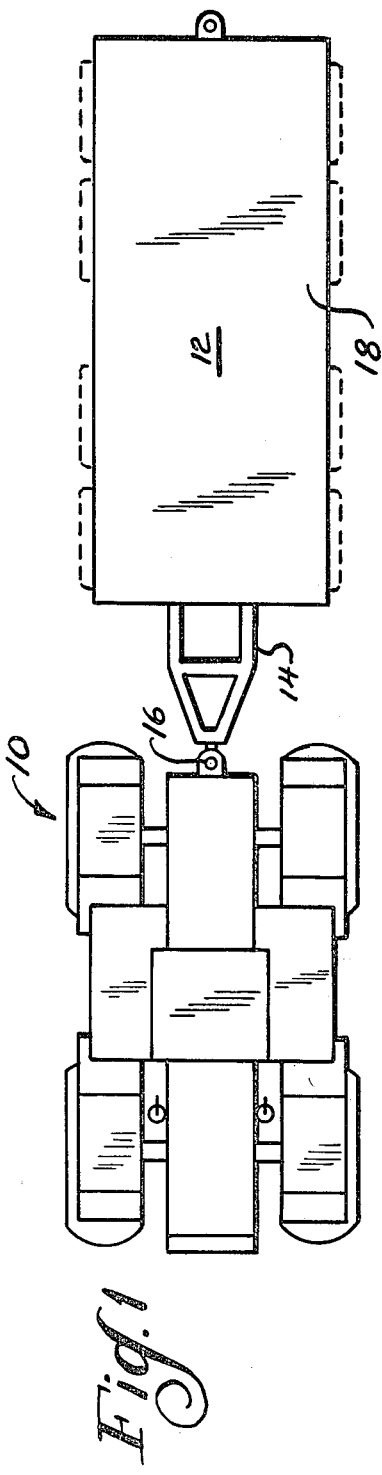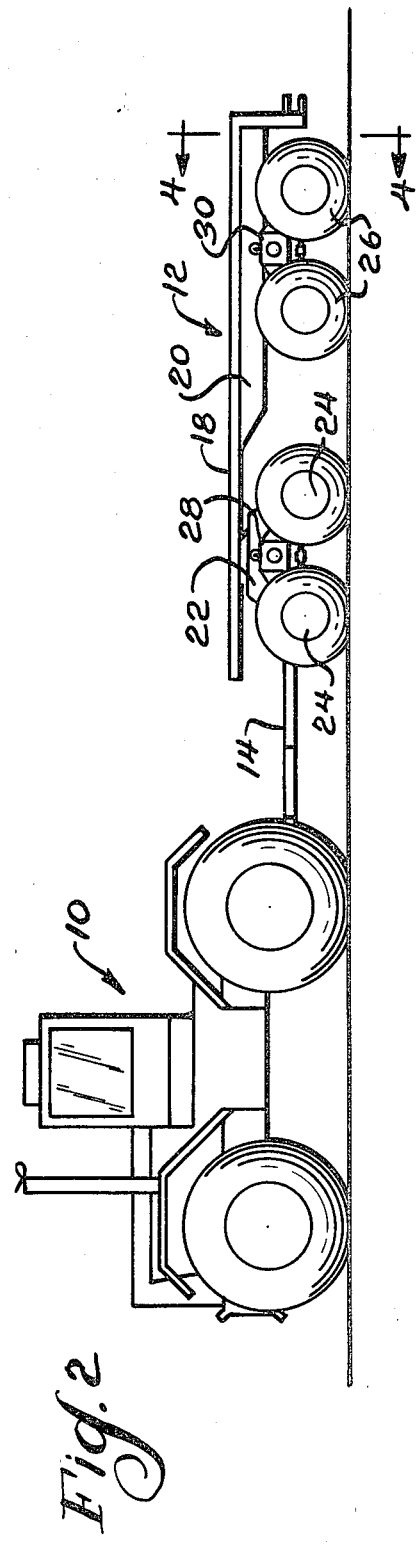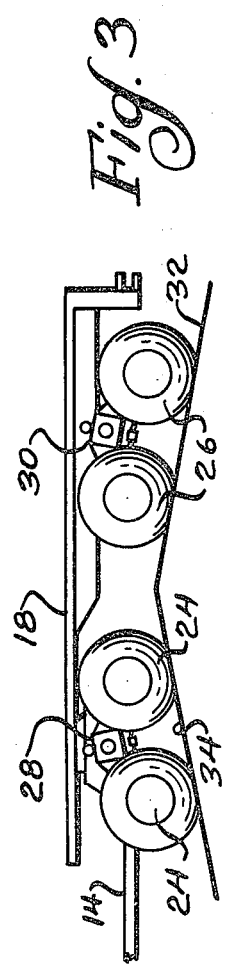

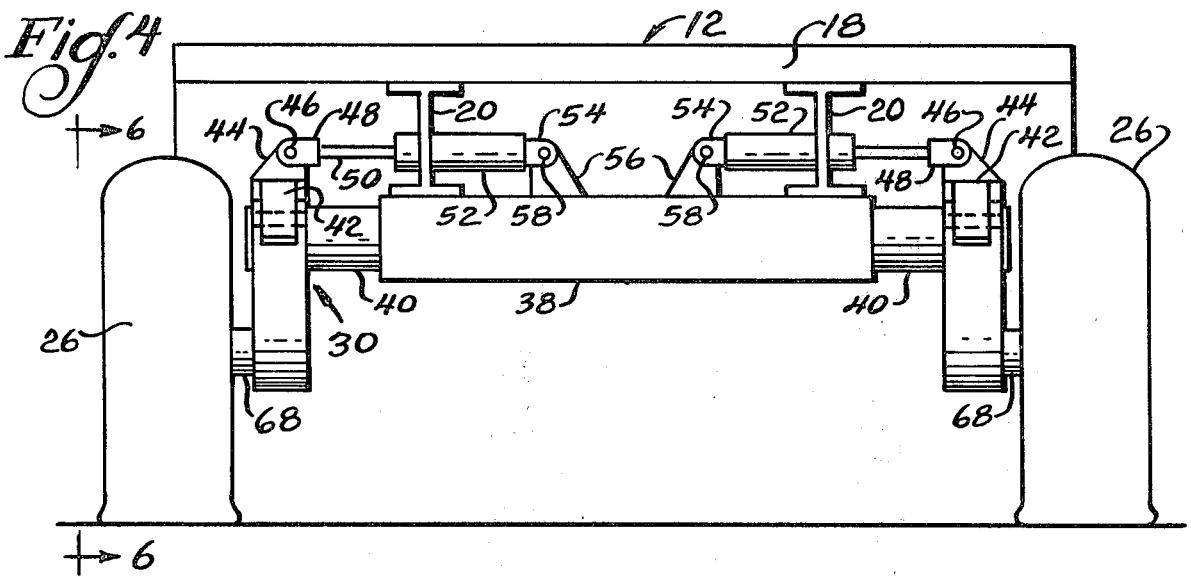
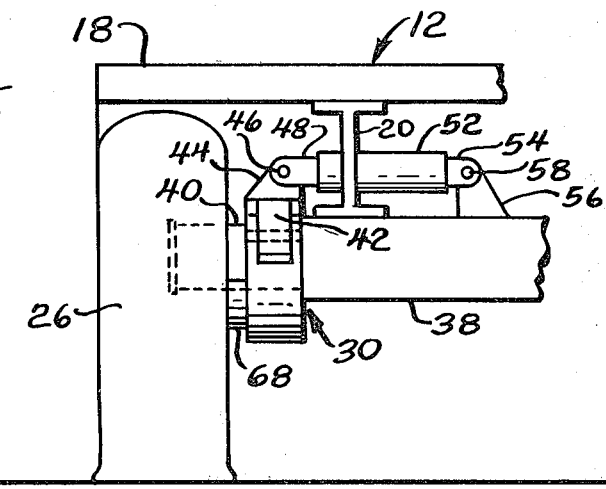
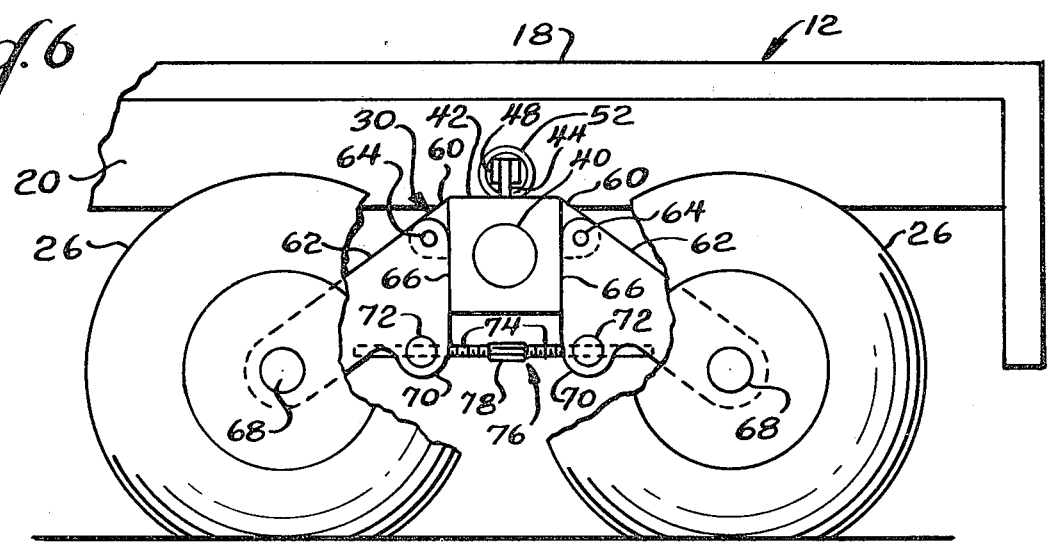

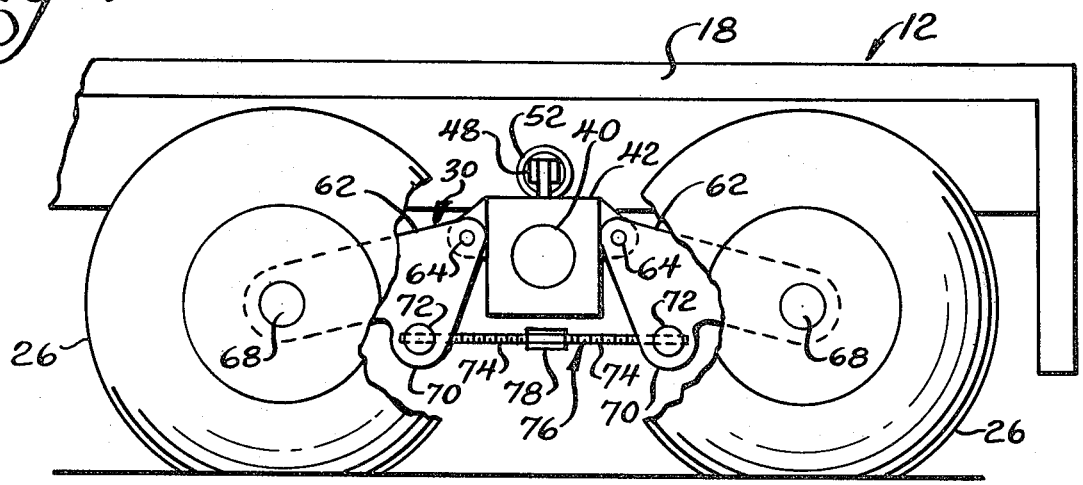
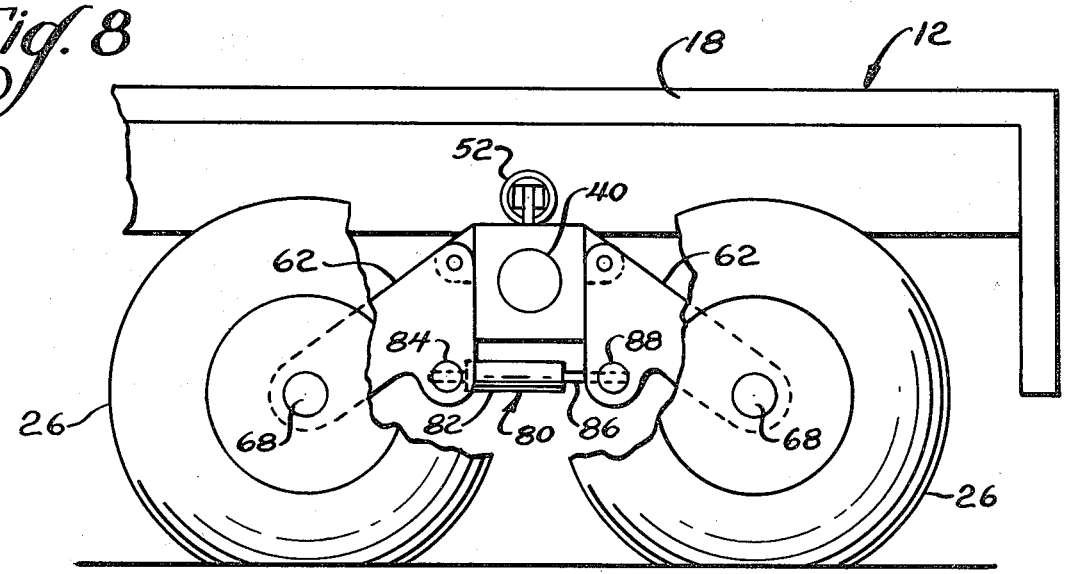

TRAILER WITH ADJUSTABLE WHEELS

This application is a continuation of co-pending application Ser. No. 925,308 filed July 17, 1978 by Lovel R. Simmons for "Trailer With Adjustable Wheels" now abandoned.

BACKGROUND OF THE INVENTION

Trailers to be towed by tractors are well known. The requirements for towing such tractors may vary quite considerably in accordance with whether the trailer is to be pulled over a relatively smooth roadway, or is to travel on crude roads or off road terrain. Many such trailers must be towed on either smooth roads or on rough roads or rough road terrain. For example, military supplies including tanks are likely to move in part over smooth roads, and in part over rough roads or off roads completely. The same is true of trailers to be towed in the area of oil wells and the like. The requirements for a trailer to be towed on a smooth road or to be towed on a rough road or off the road are frequently conflicting. It is desired to have the bed as low as possible for simplified loading, and for carrying of cargo under highway bridges. However, such a trailer may also be towed on rough roads or on off road terrain, and this requires a substantial spacing between the tops of the tires of such a trailer and the bottom of the trailer bed.

The requirements for axial spacing of sets of wheels also are antithetical. For towing on relatively smooth, level roads it is desired that the axial spacing and overall axial distance covered by wheels should be relatively small in order to stay on the road without protruding over the center line. On the other hand, when the same trailer is towed on rough roads or on off road terrain there may be considerable side-to-side tipping forces, and it therefore is desirable to have as great a spacing as possible in an axial direction between corresponding wheels or sets of wheels.

OBJECTS AND SUMMARY OF THE DISCLOSURE

In view of the foregoing it is an object of this invention to provide structure for relatively raising and lowering the wheels of a trailer with reference to the bed thereof.

It is a further object of the present invention to provide structure for moving sets of wheels axially relative to one another to provide a greater or lesser wheel spread as may be necessary.

In order to attain the foregoing and other objects of the present invention it is proposed to provide sets of wheels with the wheels offset fore and aft of one another and mounted on pivotal brackets or supports having pivot positions inwardly of the wheels. Means is provided for spreading the aforesaid pivoted brackets toward or away from one another to alter the vertical spacing between wheels and trailer bed, thereby to lower or raise the bed.

The wheel trucks or supports are slidably mounted on a support, and means is provided for sliding the supports toward or away from the center line of the trailer to provide a greater or lesser wheel spread as required.

DRAWING DESCRIPTION

The invention will best be understood from the following detailed disclosure when taken in connection with the accompanying drawings wherein:

FIG. 1 is a top view of a trailer constructed in accordance with the principles of the present invention connected to and towed by a tractor;

FIG. 2 is a side view of the tractor and trailer;

FIG. 3 is a side view of the trailer alone illustrating the necessity of spaccing the trailer bed a substantial distance above the wheels in some instances;

FIG. 4 is a cross-sectional view on a larger scale and taken generally along the line 4—4 in FIG. 2, the wheels being shown in extended position;

FIG. 5 is a fragmentary cross-sectional view corresponding to FIG. 4 with the wheels in retracted positions;

FIG. 6 is a side view of one wheel assembly as taken substantially along the line 6—6 in FIG. 4 with the bed raised relative to the wheels;

FIG. 7 is a view similar to FIG. 6 showing the bed lowered almost into contact with the tires on the wheels; and FIG. 8 is a view similar to FIG. 6 showing a modification of the invention.

DETAILED DISCLOSURE

Attention now should be paid to the drawings in greater particularity starting first with FIGS. 1 and 2. In these figures a tractor 10 of known commercial construction, and preferably four wheel drive and low pressure tires is shown as towing a trailer 12 attached to the tractor by means of a tongue or drawbar structure 14 on the trailer pivotally connected at 16 to the tractor. The trailer 12 includes a bed 18 having longitudinally disposed reinforcing members 20 on the underside thereof. A front wheel truck 22 is pivotally mounted beneath the bed adjacent the front thereof in accordance with conventional practice. A set of four wheels 24 is rotatably carried by the front truck 22 as will hereinafter be set forth in some detail. A set of four rear wheels is supported generally beneath the rear portion of the bed as also will be set forth in detail shortly hereinafter.

The front wheels are supported on the truck 22 by means of walking beam structures 28. Similarly, the rear wheels are supported from the bed frame structure 20 by walking beam structures 30. The walking beam structures allow sets of tandem wheels to move up and down to keep all of the wheels in contact with the supporting surface at all times.

This is particularly important with regard to uneven terrain, such as off road. For example as shown in FIG. 3 it may be necessary to move from a ground surface 32, rising in the direction of travel, to a ground surface 34 declining in the direction of travel and with an apex 36 in between. When all of the wheels of the trailer are on the upward incline 32, or all on the lowering incline 34 there is no problem. However, when the front wheels have passed the apex 36, wheels are on the oppositely inclined surfaces. The bed 18 may be level as shown in FIG. 3 with the walking beam structure 28 tipped in one direction to keep the wheels 24 in contact with the supporting surface, while the walking beam structure 30 is tilted in the opposite direction to keep the wheels 26 in contact with the supporting surface. As is clearly shown in FIG. 3 the wheels that are tipped upwardly may come substantially into contact with the underside of the bed. This illustrates the fact that for irregular roads or off-road use there must be substantial clearance between the tops of the tires in horizontal position as shown in FIG. 2 to permit the tipping as shown in FIG. 3. In one practical example the bed is twenty feet long and eight feet wide, there being a sixteen inch spacing between the tops of the tires with everything level as in FIG. 2. The tires themselves in such example are 16×16, 6 ply operating at 35 PSI. The distance between the pivot centers of the fore and aft walking beam structures is ten feet ten inches in the specific example mentioned.

Structure for increasing the wheel spread or axial distance between wheels, and structure for raising and lowering the bed relative to the wheels are shown in FIGS. 4–7. In FIGS. 4 and 5 it will be seen that there is a transverse cylinder 38 secured to the longitudinal reinforcing members. The reinforcing members are illustrated as being I-beams, but other suitable configurations could be used. The transverse cylinder 38 is secured beneath the beams 20 by suitable means, such as welding. Pivot shafts 40 extend from either end of the transverse cylinder 38, and the walking beam structures are secured thereon as will be discussed shortly hereinafter.

At the outer extremity of each pivot shaft 40 is a collar 42 (see also FIGS. 6 and 7) secured thereto and having an upstanding bracket 44 fixed thereto, as by welding or integral therewith. A cross pin 46 pivotally secures a bifurcated bracket 48 at the end of a piston rod 50. The piston rod is secured to a piston (now shown) within a hydraulic cylinder 52, the opposite end of which is provided with a bifurcated bracket 54 secured to an upstanding bracket or ear 56 by a cross pin 58. The hydraulic cylinder 52 and internal piston are controlled by pressurized hydraulic fluid developed in a suitable pump on the tractor 10 and controllable by known manually operable valves in the cab of the tractor. The cylinders 52 and accompanying pistons are double acting. The fluid pressure can be used to extend the piston rod 50 as in FIG. 4 to provide a maximum axial distance between the wheels 26. On the other hand, the piston rod may be completely retracted as in FIG. 5 to decrease the distance axially between the wheels. The difference in wheel spread can be significant, in that the greater wheel spread illustrated in FIG. 4 provides enhanced stability against lateral tipping, such as may be encountered in off road or other rough terrain travel. On the other hand, for certain roadways it is desired to keep the wheel spread at a minimum to remain on one side of the road, and the minimum wheel spread shown in FIG. 5 is of value for this purpose. The minimum wheel spread also may be resorted to when it is necessary to tow the trailer through or between obstacles.

It is obvious that when the wheel spread is moved between the maximum shown in FIG. 4 and the minimum shown in FIG. 5 the pivot shafts 40 move in and out of the transverse cylinder 38. In the usual case the end members 42 would be fixed to the respective pivot shafts 40, and these pivot shafts would pivot within the transverse cylinder 38 upon pivoting of the walking beams as in FIG. 3. This requires a slightly loose fit of the brackets or clevises 48 with the respective brackets on ears 44 and 56. As an alternate construction it is contemplated that the pivot shafts 40 will themselves be the pistons or piston rods with the transverse cylinders 38 being the hydraulic cylinders, whereby the problem of pivoting would be completely avoided.

As shown in FIGS. 6 and 7 the walking beam structures 30 are each of a three piece construction, including the aforementioned fittings or members 52. Ears 60 are provided on the front and rear faces of the members 42 which are shown as being square. Pivot arms or shafts 62 are pivotally connected to the brackets or ears 60 by means of pivot pins 64. The pivot arms 62 will have confronting surfaces 66 which may engage the adjacent faces of the fittings or members 42 with the wheel axials drawn as close as possible to one another in a tandem or fore and aft direction, whereby positively to limit approach of the wheels to one another to avoid engagement of adjacent tires. The brackets 62 are of somewhat triangular configuration, the axles 68 being at the remote extremities thereof. Mounting of wheels for rolling thereof is well known and no specific structure as to bearings or the like therefore need be shown. The brackets 62 also have adjacent lower portions 70 pivotally carrying pins 72 having diagonal, threaded openings therethrough and receiving the opposite threaded ends 74 of a threaded rod or jack screw 76. As will be apparent the jack screw 76 has the opposite threaded ends 74 thereof of opposite thread, and this is also true of the receiving threaded rods 72. In intermediate section 78 is configured for ready engagement with a wrench to turn the threaded rod in either direction to move the wheel axles 68 toward one another (FIG. 6) or away from one another (FIG. 7), and thereby to raise and lower the bed 18. It will be apparent that the intermediate section 78 could be in the form of gear teeth meshing with a hydraulic or an electric motor to turn the jack screw 76 under control of a lever in the cab of the tractor, thereby making it unnecessary to stop the vehicle for manual handling of the jack screw.

A modified form of one portion of the invention is shown in FIG. 8. The structure as shown in FIG. 8 is generally identical with that previously disclosed and like numbers are used for identification, thereby avoiding the necessity of repetition. The threaded rod 76 is replaced by a hydraulic cylinder arrangement 80 including a cylinder 82 secured to a cross-piece 84 in the arm 62. A piston rod 86 extends from the piston and is secured internally of the cylinder 82 to a piston (not shown), the outer end of the piston rod being secured to a cross member 88 in the arm 62. Hydraulic hoses and connections of conventional construction are utilized under control of a valve in the cab of the tractor (not shown) to control extension or retraction of the hydraulic cylinder arrangement 80 to raise and lower the wheels relative to the bed, thereby controlling the elevation of the bed above the ground.

The specific examples of the invention as shown herein will be understood as being for exemplary purposes only. Various changes in structure will no doubt occur to those skilled in the art and will be understood as forming a part of the present invention insofar as they fall within the spirit and scope of the appended claims.

The invention is claimed as follows:

1. A load carrying machine comprising structure of substantially rectangular outline having a front end and a back end for receiving and supporting a load, a plurality of wheels comprising at least two sets of wheels, each set comprising at least four wheels arranged as two tandem pairs, the pairs of each set being axially spaced transversely of said machine, one set of which is adjacent the front end and one set of which is adjacent the rear end of said load supporting structure, the wheels of each tandem pair being respectively adjacent opposite sides of said structure, said front set of wheels being mounted from said machine for pivoting about a substantially vertical axis, means interconnecting said wheels and said structure for moving axially spaced tandem pairs of said wheels of each set toward and away from one another axially of such wheels, and means for moving all of said wheels up and down relative to said supporting structure to vary the height of said supporting structure, the underside of said structure adjacent the front thereof being substantially flat to permit said front set of wheels to pivot with said wheels in axially extended relation, the wheels of each tandem pair respectively being mounted on tandem pairs of pivot arms, each tandem pair of pivot arms being pivoted on a common member, each such member being mounted from said structure for rocking about a respective axis transverse of said machine, said pivot arms being pivoted on said member relatively adjacent the upper portion of said member and diverging downwardly therefrom respectively in fore and aft directions, and wherein the means for moving up-and-down comprises means acting between pairs of pivot arms to effect pivoting thereof to raise or lower the wheels relative to said supporting structure, said arms having portions thereof abuttable with lower portions of a respective common member to serve as stops for said arms to limit lowering of said wheels.

2. A machine as set forth in claim 1 wherein each pivot arm is elongated and has an oblique end extending below the pivot of each arm and confronting a respective common member, said respective common member having a face abuttable by a respective oblique end.

* * * * *